(12) United States Patent
Anzai

(10) Patent No.: US 8,623,563 B2
(45) Date of Patent: Jan. 7, 2014

(54) METHOD FOR STARTING-UP SOLID OXIDE FUEL CELL SYSTEM

(75) Inventor: Iwao Anzai, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 1332 days.

(21) Appl. No.: 11/813,444

(22) PCT Filed: Jan. 5, 2006

(86) PCT No.: PCT/JP2006/000017
§ 371 (c)(1),
(2), (4) Date: Jul. 6, 2007

(87) PCT Pub. No.: WO2006/073150
PCT Pub. Date: Jul. 13, 2006

(65) Prior Publication Data
US 2009/0291335 A1 Nov. 26, 2009

(51) Int. Cl.
*H01M 8/06* (2006.01)
*H01M 8/04* (2006.01)

(52) U.S. Cl.
USPC .................... 429/423; 429/425; 429/441

(58) Field of Classification Search
None
See application file for complete search history.

(56) References Cited

U.S. PATENT DOCUMENTS

| | | | |
|---|---|---|---|
| 5,397,656 A * | 3/1995 | Morimoto et al. | 429/415 |
| 5,958,614 A * | 9/1999 | Takei et al. | 429/413 |
| 2003/0207163 A1 * | 11/2003 | Chen | 429/26 |
| 2004/0038095 A1 | 2/2004 | Kushibiki et al. | |
| 2004/0146763 A1 * | 7/2004 | Pondo et al. | 429/26 |

FOREIGN PATENT DOCUMENTS

| | | |
|---|---|---|
| EP | 1 020 401 A1 | 1/2000 |
| JP | 2000-203802 | 7/2000 |
| JP | 2001-106507 | 4/2001 |
| JP | 2001-146405 | 5/2001 |
| JP | 2003-272690 | 9/2003 |
| JP | 2004-87169 | 3/2004 |
| JP | 2004-319420 | 11/2004 |

(Continued)

OTHER PUBLICATIONS

Extended European Search Reported dated Oct. 31, 2011 in corresponding Application No. 06702116.

*Primary Examiner* — Barbara Gilliam
*Assistant Examiner* — Stephan Essex
(74) *Attorney, Agent, or Firm* — Knobbe Martens Olson & Bear LLP

(57) ABSTRACT

An SOFC system is started-up efficiently in a short time while letting a hydrogen concentration in a reformed gas high. A method for starting-up an SOFC system including a reformer having a reforming catalyst, and an SOFC which uses the reformed gas as a fuel, in which, catalyst A having POX function and catalyst B having SR function are used as the reforming catalyst, the method including the steps of: increasing the temperature of catalyst A, by combustion heat or electricity, to a temperature at which POX reaction can proceed; increasing the temperature of catalyst B by POX reaction heat, increasing the temperature of SOFC by feeding the reformed gas to an anode and heating catalyst B by combustion heat generated from combustion of a reformed gas discharged from the anode, or increasing the temperature of catalyst B by POX reaction heat, increasing the temperature of SOFC by feeding a combustion gas produced from combustion of the reformed gas to a cathode and heating catalyst B by this combustion gas; and reducing the proportion of POX reaction or stopping POX reaction and perform SR, after catalyst B is heated to a temperature at which SR reaction can proceed.

13 Claims, 4 Drawing Sheets

(56) References Cited

FOREIGN PATENT DOCUMENTS

| JP | 2004319420 | A | * | 11/2004 |
| WO | WO 03/085767 | A1 | * | 10/2003 |
| WO | 2005069776 | A2 | | 8/2005 |

* cited by examiner

METHOD FOR STARTING-UP SOLID OXIDE FUEL CELL SYSTEM

This application is the U.S. National Phase under 35 U.S.C. §371 of International Application PCT/JP2006/300017, filed Jan. 5, 2006, which claims priority to Japanese Patent Application No. 2005-002537, filed Jan. 7, 2005. The International Application was published under PCT Article 21(2) in a language other than English.

TECHNICAL FIELD

The present invention relates to a solid oxide fuel cell (SOFC) system, and more particularly, to a method for starting-up a SOFC system equipped with a reformer for reforming raw material for producing hydrogen such as a hydrocarbon fuel to produce a reformed gas containing hydrogen, and an SOFC which uses the reformed gas as a fuel.

BACKGROUND ART

In an SOFC, to generate electricity by the electrochemical reaction of hydrogen and oxygen, a gas rich in hydrogen is fed to an anode of the SOFC. There is known an SOFC system including a reformer for reforming raw material for producing hydrogen such as a hydrocarbon fuel to produce hydrogen.

Reforming type includes partial oxidation reforming (POX), auto-thermal reforming (ATR) and steam reforming (SR). For example, taking up methane as an example of the raw material for producing hydrogen, in the steam reforming, methane is decomposed to produce hydrogen by the reaction represented by $CH_4+H_2O \rightarrow CO+3H_2$, and in the partial oxidation reforming, methane is decomposed to produce hydrogen by the reaction represented by $CH_4+1/2O_2 \rightarrow CO+2H_2$. In the auto-thermal reforming, both of these reactions take place.

With the steam reforming, compared to the other reforming, a hydrogen concentration in a reformed gas produced is higher, and when it is applied to an SOFC system, higher electric generation efficiency is achieved. Since it has such advantage, an SOFC system including a steam reformer and an SOFC which uses the reformed gas produced by the steam reformer as a fuel has been developed.

Such an SOFC system is described, for example, in Patent Document 1.
Patent Document 1: Japanese Patent Laid-Open No. 2003-272690

DISCLOSURE OF THE INVENTION

However, the steam reforming reaction involves comparatively large heat absorption, and the reaction does not substantially take place unless at a comparatively high temperature. Therefore, at the starting-up, the steam reformer, especially a catalytic layer thereof is heated to a high temperature of, for example, about 600° C. Further, the SOFC, at the starting-up, is heated to a high temperature of, for example, about 800° C.

As described above, it is necessary to heat the SOFC system equipped with the steam reformer to a comparatively high temperature, and it is required to start-up the SOFC system efficiently in a short time.

An object of the present invention is to provide a method for starting-up a reformer efficiently in a short time without losing the advantage of the steam reforming that a comparatively high hydrogen concentration in a reformed gas can be achieved, and further starting-up an SOFC system efficiently in a short time.

The present invention provides a method for starting-up a solid oxide fuel cell system which includes a reformer having a reforming catalyst, for reforming raw material for producing hydrogen to produce a reformed gas containing hydrogen, and a solid oxide fuel cell which uses the reformed gas as a fuel, wherein a catalyst having partial oxidation reforming function and a catalyst having steam reforming function are used as the reforming catalyst, and the method includes the steps of:

a) increasing the temperature of the catalyst having partial oxidation reforming function, by combustion heat or electricity, to a temperature at which the partial oxidation reforming reaction can proceed, b) conducting the partial oxidation reforming reaction, increasing the temperature of the catalyst having steam reforming function by the heat generated from the partial oxidation reforming reaction, and increasing the temperature of the solid oxide fuel cell by feeding the reformed gas to an anode of the solid oxide fuel cell, c) combusting the reformed gas discharged from the anode of the solid oxide fuel cell, and heating the catalyst having steam reforming function by heat generated from the combustion, and d) reducing the proportion of the partial oxidation reforming reaction or stopping the partial oxidation reforming reaction and performing the steam reforming, after the catalyst having steam reforming function is heated to a temperature at which the steam reforming reaction can proceed.

This method, preferably, further includes the step of e) generating electricity at the solid oxide fuel cell and increasing the temperature of the fuel cell by the cell reaction heat, after the fuel cell is heated to a temperature at which the fuel cell can generate electricity.

In step a), it is possible to increase the temperature of the catalyst having partial oxidation reforming function, using a combustion gas produced from combustion of the raw material for producing hydrogen, to a temperature at which the partial oxidation reforming reaction can proceed, and also to increase the temperature of the solid oxide fuel cell by feeding the combustion gas produced from combustion of the raw material for producing hydrogen to the cathode of the solid oxide fuel cell.

In step c), it is possible to heat the catalyst having steam reforming function using a combustion gas produced from combustion of the reformed gas discharged from the anode of the solid oxide fuel cell, and also to increase the temperature of the solid oxide fuel cell by feeding the combustion gas produced from combustion of the reformed gas discharged from the anode of the solid oxide fuel cell to the cathode of the solid oxide fuel cell.

The present invention provides a method for starting-up a solid oxide fuel cell system which includes a reformer having a reforming catalyst, for reforming raw material for producing hydrogen to produce a reformed gas containing hydrogen, and a solid oxide fuel cell which uses the reformed gas as a fuel, wherein a catalyst having partial oxidation reforming function and a catalyst having steam reforming function are used as the reforming catalyst, and the method includes the steps of:

i) increasing the temperature of the catalyst having partial oxidation reforming function, by combustion heat or electricity, to a temperature at which the partial oxidation reforming reaction can proceed, ii) conducting the partial oxidation reforming reaction, increasing the temperature of the catalyst having steam reforming function by heat generated from the partial oxidation reforming reaction, increasing the temperature of the solid oxide fuel cell by feeding a combustion gas produced from combustion of the reformed gas to a cathode of the solid oxide fuel cell, and heating the catalyst having steam reforming function by the combustion gas produced from combustion of the reformed gas, and iii) reducing the proportion of the partial oxidation reforming reaction or stopping the partial oxidation reforming reaction and performing the steam reforming, after the catalyst having steam reforming function is heated to a temperature at which the steam reforming reaction can proceed.

This method, preferably, further includes the step of iv) generating electricity at the solid oxide fuel cell and increasing the temperature of the fuel cell by the cell reaction heat, after the solid oxide fuel cell is heated to a temperature at which the fuel cell can generate electricity.

In the step i), it is possible to increase the temperature of the catalyst having partial oxidation reforming function, using a combustion gas produced from combustion of the raw material for producing hydrogen, to a temperature at which the partial oxidation reforming reaction can proceed, and also to increase the temperature of the solid oxide fuel cell by feeding the combustion gas produced from combustion of the raw material for producing hydrogen to the cathode of the solid oxide fuel cell.

According to the present invention, it is possible to start-up a reformer efficiently in a short time without losing the advantage of the steam reforming that a comparatively high hydrogen concentration in a reformed gas can be achieved, and further it is possible to start-up an SOFC system efficiently in a short time.

DESCRIPTION OF SYMBOLS

Figure 1:
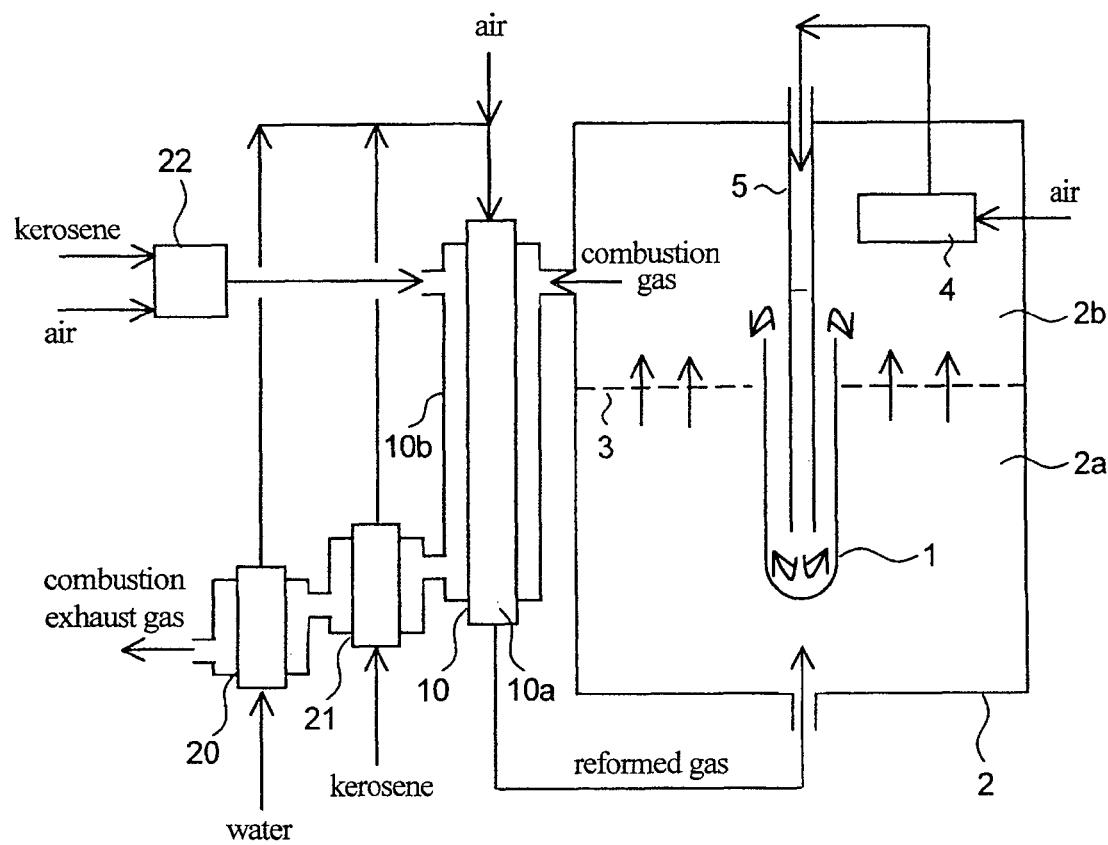
FIG. 1 is a flow diagram illustrating an example of an SOFC system to which a starting-up method of the present invention is applicable.

1 SOFC (anode:outside)
2 vessel for containing SOFC
2a region (anode side)
2b region (cathode side)
3 partition plate through which a gas can pass
4 air preheater
5 air feed pipe
10 reformer
10a reforming reaction tube
10b reformer vessel
20 water vaporizer
21 kerosene vaporizer
22 start-up combustor
101 SOFC (cathode: outside)
103 partition plate through which a gas cannot pass
105 reformed gas feed pipe
120a water vaporizer (for starting-up operation)
120b water vaporizer (for normal operation)
121a kerosene vaporizer (for starting-up operation)
121b kerosene vaporizer (for normal operation)
122 combustor for normal operation

BEST MODE FOR CARRYING OUT THE INVENTION

Raw Material for Producing Hydrogen

For the raw material for producing hydrogen, it is possible to use a material, as appropriate, selected from substances from which reformed gas containing hydrogen can be produced by the partial oxidation reforming method or the auto-thermal reforming method, and by the steam reforming method. For example, a compound of which molecule has carbon and hydrogen therein, such as hydrocarbons, alcohols and ethers, may be used. As a preferable example which may be inexpensively available for industrial use or consumer use, there may be methanol, ethanol, dimethyl ether, city gas, LPG (liquefied petroleum gas), gasoline and kerosene. Among them, kerosene is preferable, because it may be easily available for industrial use and consumer use, and easily handled.

Reformer

In the present invention, a catalyst having partial oxidation reforming function and a catalyst having steam reforming function are used as a reforming catalyst. A partial oxidation reforming catalyst having partial oxidation reforming function and substantially not having steam reforming function, and a steam reforming catalyst having steam reforming function and substantially not having partial oxidation reforming function may be used as the reforming catalyst. Alternatively, only an auto-thermal reforming catalyst having both of partial oxidation reforming function and steam reforming function may be used as the reforming catalyst described above.

A reformer includes a reforming reaction part having the reforming catalyst and a vessel allowing a gas to flow for heating the reforming reaction part externally. For example, a reformer may be used which includes a reforming reaction tube having a reforming catalyst layer formed therein by filling the reforming catalyst as the reforming reaction part, and a vessel for containing this reaction tube therein. Further, the reformer may be configured in a manner that the reaction tube runs through the vessel. Further, a reformer may be configured in a manner that a combustor is provided inside of the reformer and outside of the reforming reaction part, and the reforming reaction part is heated by a combustion gas of this combustor. Alternatively, when a gas for heating can be fed from outside of the reformer, it is not necessary to provide such a combustor.

The reformer is connected to a line for feeding a gas containing oxygen such as air, raw material for producing hydrogen and steam to the reforming catalyst, each of them separately, or mixed with each other as appropriate. Further, the reformer is connected to a line for feeding the reformed gas to an anode of the SOFC.

For example, a reforming catalyst layer may be formed by filling a front part (upstream side) of the inside of the reforming reaction tube with the partial oxidation reforming catalyst, and filling a rear part (downstream side) thereof with the steam reforming catalyst. Alternatively, a reforming catalyst layer may be formed by filling the front part of the reaction tube with the auto-thermal reforming catalyst, and filling the rear part with the steam reforming catalyst. Further, a reforming catalyst layer may be formed by filling the inside of the reaction tube only with the auto-thermal reforming catalyst.

In configurations as described above, a single reformer may be basically used, but the reformer is not necessarily required to be single, and a plurality of reformers having a different type of reforming catalyst from each other may be used. For example, a reformer (partial oxidation reformer) having a reforming catalyst layer composed of the partial oxidation reforming catalyst and a reformer (steam reformer) having a reforming catalyst layer composed of the steam reforming catalyst may be used.

As the partial oxidation reforming catalyst, the steam reforming catalyst and the auto-thermal reforming catalyst, a known catalyst may be used, respectively. As an example of the partial oxidation reforming catalyst, there may be a platinum-based catalyst, as an example of the steam reforming catalyst, a ruthenium-based catalyst and a nickel-based catalyst, and as the auto-thermal reforming catalyst, a rhodium-based catalyst.

A temperature at which the partial oxidation reforming reaction can proceed is, for example, in the range of at least 200° C. and at most 1000° C., and a temperature at which the steam reforming reaction can proceed is, for example, in the range of at least 400° C. and at most 1000° C.

Now, in relation to each of the steam reforming and the auto-thermal reforming, conditions for normal operation will be described hereinafter.

A reaction temperature of the steam reforming is, for example, in the range from 450° C. to 900° C., preferably from 500° C. to 850° C., and more preferably from 550° C. to 800° C. An amount of steam introduced into a reaction system is defined as a ratio of the number of moles of water molecule to the number of moles of carbon atom included in the raw material for producing hydrogen (steam/carbon ratio). This value is preferably in the range from 0.5 to 10, more preferably from 1 to 7, and still more preferably from 2 to 5. When the raw material for producing hydrogen is liquid, a space velocity (LHSV) is expressed by A/B, where A (L/h) is a flow rate when the raw material for producing hydrogen is in a liquid state, and B (L) is a volume of the catalytic layer, and this value is preferably set to be in the range from 0.05 to 20 $h^{-1}$, more preferably from 0.1 to 10 $h^{-1}$, and still more preferably from 0.2 to 5 $h^{-1}$.

In the auto-thermal reforming, besides steam, a gas containing oxygen is added to raw material. For the gas containing oxygen, pure oxygen may be used, but air is preferable because of easy availability. The gas containing oxygen may be added to balance the heat-absorbing reaction involved in the steam reforming reaction, and to generate heat in an amount sufficient to maintain temperatures of the reforming catalyst layer and the SOFC or to increase their temperatures. An amount of addition of the gas containing oxygen is preferably in the range from 0.05 to 1, more preferably from 0.1 to 0.75, and still more preferably from 0.2 to 0.6, as a ratio of the number of moles of oxygen molecule to the number of moles of carbon atom contained in the raw material for producing hydrogen (oxygen/carbon ratio). A reaction temperature of the auto-thermal reforming reaction is set to be, for example, in the range from 450° C. to 900° C., preferably from 500° C. to 850° C., and more preferably from 550° C. to 800° C. When the raw material for producing hydrogen is liquid, a space velocity (LHSV) is selected to be in the range preferably from 0.1 to 30, more preferably from 0.5 to 20, and still more preferably from 1 to 10. An amount of steam introduced into the reaction system, as the steam/carbon ratio, is in the range preferably from 0.3 to 10, more preferably from 0.5 to 5, and still more preferably from 1 to 3.

SOFC

An SOFC selected from known SOFCs may be used as appropriate. It may be tubular or planer.

A temperature at which the SOFC can generate electricity is, for example, in the range of at least 500° C. and at most 1200° C.

Components for SOFC System

A known component for an SOFC system including a reformer may be properly provided, as required. For a specific example, there may be a desulfurizer for reducing a sulfur concentration in the raw material for producing hydrogen, a vaporizer for vaporizing raw material for producing hydrogen when the material is liquid, means for feeding a gas containing oxygen such as air to the cathode of the SOFC, a steam generator for generating steam to humidify a gas fed to the reformer or the SOFC, a cooling system for cooling various devices such as the SOFC, pressurizing means for pressurizing various fluids such as a pump, a compressor and a blower, flow adjustment means or flow path blocking/switching means for adjusting a flow rate of a fluid or blocking/switching a fluid flow such as a valve, a heat exchanger for heat exchange and heat recovery, a vaporizer for vaporizing liquid, a condenser for condensing a gas, heating/heat-retaining means for externally heating various devices by steam etc., storage means for storing various fluids, an air system and an electric system for instrumentation, a signal system for control, a control device and an electric system for outputting and powering.

Starting-Up Method

Step a) or i)

According to the present invention, first, a step a) or i) is carried out in which the temperature of the catalyst having partial oxidation reforming function is increased, by combustion heat or electricity, to a temperature at which the partial oxidation reforming reaction can proceed.

For the catalyst having partial oxidation reforming function, a partial oxidation reforming catalyst or an auto-thermal reforming catalyst may be used.

The combustion heat may be obtained by burning a combustible material in a combustor as appropriate. For example, the combustible material may be burned as appropriate, in the combustor to heat a catalyst by heat exchange with the combustion gas produced. To heat the catalyst with electricity, for example, an electric heater may be used. The reaction tube having the catalyst therein may be equipped with an electric heater, and the heater may be powered. Alternatively, when electric current can flow in the catalyst as a metal supported catalyst, the catalyst may be heated by powering the catalyst itself. These heating methods may be properly used together.

Further, as required, the temperature of a water vaporizer or a vaporizer for vaporizing raw material for producing hydrogen may be increased by combustion heat or electricity to generate steam or vaporize the raw material for producing hydrogen.

Step b)

After the step a), a step b) may be carried out in which the partial oxidation reforming reaction takes place, so that the temperature of the catalyst having steam reforming function is increased by heat generated from the partial oxidation reforming reaction, and the temperature of the solid oxide fuel cell is increased by feeding the reformed gas to the anode of the solid oxide fuel cell.

The steam reforming reaction may proceed along with the partial oxidation reforming reaction. That is, in this step, the partial oxidation reforming may be performed or the auto-thermal reforming may be conducted. Because the catalyst is heated by reaction heat in this step, in case of the auto-thermal reforming, the heat generated due to the partial oxidation reforming reaction is controlled to exceed the heat absorbed by the steam reforming reaction, and therefore, heat is generated in total. For the catalyst having steam reforming function, a steam reforming catalyst or an auto-thermal reforming catalyst may be used.

For example, when a front part of the inside of a reforming reaction tube is filled with the partial oxidation reforming catalyst (or the auto-thermal reforming catalyst), and a rear part thereof is filled with the steam reforming catalyst, the partial oxidation reforming reaction (it may be also the auto-thermal reforming reaction involving the steam reforming reaction) is caused to proceed in the partial oxidation reforming catalyst (or the auto-thermal reforming catalyst) and the reformed gas produced thereby is brought into contact with the steam reforming catalyst (or the auto-thermal reforming catalyst), whereby, the temperature of the steam reforming catalyst (or the auto-thermal reforming catalyst) can be increased. When, for the catalyst having partial oxidation reforming function and the catalyst having steam reforming function, only the auto-thermal reforming catalyst is used, then, heat is generated due to the partial oxidation reforming reaction in the auto-thermal reforming catalytic layer, and the heat can increase the temperature of the auto-thermal reforming catalytic layer.

Further, when a partial oxidation reformer and a steam reformer are used separately, the partial oxidation reformer may perform the partial oxidation reforming and the reformed gas which is at a comparatively high temperature by heat generated due to the partial oxidation reforming reaction may be fed to the steam reformer to heat the steam reforming catalyst.

For performing the partial oxidation reforming (or the auto-thermal reforming), to the partial oxidation reforming catalyst (or the auto-thermal reforming catalyst), raw material for producing hydrogen and a gas containing oxygen are fed. For the auto-thermal reforming, steam is also fed to the reforming catalyst. Further, even for the partial oxidation reforming, as desired, steam may be fed to the reforming catalyst In any case, the reformed gas which is obtained from the reformer and which is at a comparatively high temperature owing to the heat generated by the partial oxidation reforming reaction is fed to an anode of the SOFC to increase the temperature of the SOFC.

Step c)

If step b) described above is performed, a reformed gas is discharged from the anode of the SOFC. Therefore, preferably, the step b) is performed, and at the same time, the step c) may be performed in which the reformed gas discharged from the anode of the solid oxide fuel cell is burned, and with this combustion heat, the catalyst having steam reforming function (the steam reforming catalyst or the auto-thermal reforming catalyst) is heated. Using this combustion heat, also, the gas containing oxygen used for this combustion may be pre-heated, the SOFC may be heated, the raw material for producing hydrogen may be pre-heated or vaporized, and steam may be produced. Using the combustion heat described above, the steam reforming catalyst (or the auto-thermal reforming catalyst) may be heated and the gas brought into contact with the steam reforming catalyst (or the auto-thermal reforming catalyst) may be fed to the anode of the SOFC, and thereby, the combustion heat described above may indirectly heat the SOFC.

In step c), a gas containing oxygen such as air may be fed to the cathode of the SOFC, and the reformed gas which passed through the anode and the gas containing oxygen which passed through the cathode may be reacted with each other to burn.

For this burning, a combustor capable of burning a reformed gas may be used as appropriate. This combustor may be provided in a vessel for containing the SOFC or in the reformer.

Step ii)

Step ii) also may be performed, instead of the steps b) and c), in which the partial oxidation reforming reaction takes place, the temperature of the catalyst having steam reforming function is increased by heat generated due to the partial oxidation reforming reaction, the reformed gas is burned, and the temperature of the solid oxide fuel cell is increased by feeding the combustion gas to the cathode of the solid oxide fuel cell, and at the same time, the catalyst having steam reforming function is heated using the combustion gas produced from combustion of the reformed gas.

Step d) or iii)

According to the present invention, step d) or iii) is carried out for reducing the proportion of the partial oxidation reforming reaction or stopping the partial oxidation reforming reaction to perform the steam reforming, after the catalyst having steam reforming function is heated to a temperature at which the steam reforming reaction can proceed. If the proportion of the partial oxidation reforming reaction is reduced or set to be zero, the steam reforming catalyst (or the auto-thermal reforming catalyst) is kept to be heated with the combustion gas produced from combustion of the reformed gas in the step c) or the step ii) described above. By reducing the proportion of the partial oxidation reforming reaction, or preferably stopping the partial oxidation reforming reaction to perform the steam reforming, by the time when the starting-up operation is completed, a hydrogen concentration in the reformed gas can be increased to be comparatively high. For this, an amount of the gas containing oxygen such as air supplied to the reforming catalyst is reduced or set to be zero, that is, a ratio of $O_2/C$ (oxygen/carbon ratio) may be reduced, for example, to be smaller than 1 or to be zero from the range from about 1 to about 6, and an amount of steam supplied may be increased, that is, a ratio of S/C (steam/carbon ratio) may be increased.

When the partial oxidation reformer and the steam reformer are used separately, the raw material for producing hydrogen etc. is fed to the partial oxidation reformer in step b) or ii), and the reformed gas produced by the partial oxidation reformer is fed to the steam reformer, then, in step d) or iii), the raw material for producing hydrogen etc. may not be fed to the partial oxidation reformer and may be fed to the steam reformer. That is, in step d), by switching a gas flow channel, usage of the partial oxidation reformer can be stopped. When the front part of the reaction tube is filled with the partial oxidation reforming catalyst (or the auto-thermal reforming catalyst), and the rear part thereof is filled with the steam reforming catalyst (or the auto-thermal reforming catalyst), then, by stopping supply of the gas containing oxygen to the reaction tube and starting or continuing with supply of steam, the partial oxidation reforming can be stopped and the steam reforming can be performed.

Step e) or iv)

Step e) or iv) may be carried out in which the solid oxide fuel cell generates electricity, so that the temperature of the fuel cell is increased by the cell reaction heat, after the fuel cell is heated to a temperature at which the fuel cell can generate electricity. This step is preferably performed because the SOFC can be further heated.

Electric power generated at this step may be outputted to a power system when the SOFC is connected to the power system. Alternatively, the power may be used as power for auxiliary devices such as a pump, blower etc. in the fuel cell system.

The partial oxidation reforming (or the auto-thermal reforming) can be started at a comparatively low temperature, and further, the reforming catalyst is directly heated due to the partial oxidation reforming reaction. Therefore, the temperature of the reforming catalyst can be increased efficiently in a short time. Further, after completion of the increase of the temperature, the steam reforming can be conducted solely, or if the partial oxidation reforming reaction is involved, the proportion of it can be reduced, and therefore, the hydrogen concentration in the reformed gas can be relatively high. Also, because the reformer is heated rapidly, and by heating the SOFC using the reformed gas of a high temperature obtained from the reformer, the SOFC can be also heated rapidly.

At the beginning of step b) or ii), the temperature of the partial oxidation reforming catalyst (or the auto-thermal reforming catalyst), from the viewpoint of accelerating the partial oxidation reforming reaction, is set to be preferably not smaller than 200° C., more preferably not smaller than 250° C., and still more preferably not smaller than 300° C. Further, the temperature, from the viewpoint of endurance of the catalyst or the vessel, is preferably not greater than 1000° C., more preferably not greater than 900° C., and still more preferably not greater than 800° C. This is because the temperature is set to a temperature at which the partial oxidation reforming catalyst or the auto-thermal reforming catalyst can start the reaction of oxidizing the raw material for producing hydrogen.

A temperature of the raw material for producing hydrogen or the gas containing raw material for producing hydrogen fed to the reformer and a temperature at the inlet part of the catalytic layer of the reformer are set to be preferably not greater than 700° C., in order to suppress thermal decomposition of the raw material for producing hydrogen. Further, the temperature is preferably not smaller than a temperature at which water and the raw material for producing hydrogen vaporize.

For the gas containing oxygen, pure oxygen may be used, but air is preferably used because of easy availability.

EXAMPLES

Now, the present invention will be described more particularly with respect to examples, but the present invention is not limited to these.

Example 1

FIG. 1 illustrates an example of an SOFC system to which an starting-up method of the present invention is applicable.

A tubular SOFC 1 is contained in a vessel 2 (SOFC containing vessel). In FIG. 1, only one SOFC is illustrated, but many SOFCs are arrayed. The inside of the SOFC containing vessel 2 is divided into a region (anode gas chamber) 2a and a region (here, combustion chamber) 2b by a partition plate 3 through which gas can pass so that the gas can flow therebetween. A reformed gas is fed to the region 2a, and the reformed gas flows through the partition plate 3 to enter the region 2b.

For the partition plate 3 through which gas can pass, for example, a punching plate, a foam plate or a fabric plate formed of heat-stable metal or ceramics may be used. The partition plate through which a gas can pass is a member to prevent combustion in the region (anode gas chamber) 2a.

The SOFC is tubular where the inside is the cathode and the outside is the anode, one end thereof (an end part on the lower side in FIG. 1) is closed and the other end opens into the region 2b.

The reformed gas produced by a reformer is fed to the region 2a and to the anode of the SOFC (outer surface of the cylinder). On the other hand, air preheated by an air preheater 4 provided in the region 2b is fed to the cathode of the SOFC (inner surface of the tube) through an air feed pipe 5. In such a manner, hydrogen contained in the reformed gas and oxygen in the air react with each other electrochemically to generate electricity.

An anode gas (anode off gas) after used to generate electricity is fed to the region 2b after passing through the partition plate 3 and a cathode gas (cathode off gas) after being used to generate electricity is fed to the region 2b from an opening end of the SOFC, and then, they, here, perform the combustion reaction. That is, the region 2b works as a combustion chamber. This combustion heat preheats air flowing in the air preheater 4.

For the air preheater 4, a known heat exchange structure which can heat air by the combustion gas in the region 2b may be used.

The reformer 10 is provided in a manner that a reforming reaction tube 10a containing a reforming catalyst is disposed in a vessel 10b or runs through the vessel 10b. In the reforming reaction tube, a front part thereof is filled with a partial oxidation reforming catalyst (or an auto-thermal reforming catalyst) and a rear part thereof is filled with a steam reforming catalyst, to form a reforming catalyst layer. The reforming catalyst layer may be formed by filling only the auto-thermal reforming catalyst.

A water vaporizer 20 for vaporizing water to produce steam, a kerosene vaporizer 21 for vaporizing kerosene and also a start-up combustor 22 used in an initial step (step a) of starting-up are provided.

A method for starting-up this SOFC system will be described.

First, kerosene and air are fed to the start-up combustor 22 to be burned. The combustion gas produced is fed to the vessel 10b of the reformer to heat the reforming reaction tube 10a. The combustion gas, after heating the reforming reaction tube, is directed to the kerosene vaporizer 21 and the water vaporizer 20 in sequence to increase their temperatures, respectively.

For the combustor 22, known combustion means which can burn kerosene, for example, a burner etc. may be used as appropriate. Also, here, the same fuel as the raw material for producing hydrogen is used as a fuel for the combustor, but not necessarily limited to this.

When, with the temperature-increase by the combustor described above, the water vaporizer is heated to a temperature at which it can produce steam, the kerosene vaporizer is heated to a temperature at which it can vaporize kerosene and the reforming catalyst (or the auto-thermal reforming catalyst) is heated to a temperature at which the partial oxidation reforming reaction can proceed, then, the water vaporizer generates steam and the kerosene vaporizer vaporizes kerosene, and the steam, the vaporized kerosene and air are mixed with each other and are fed to the reforming reaction tube 10a. In addition, although the steam is not necessary to perform the partial oxidation reforming reaction, from the viewpoint of preventing carbon deposition on piping etc., it is preferable that the steam is mixed, even if only the partial oxidation reforming is performed.

Further, because kerosene, which is a liquid fuel, is used here for the raw material for producing hydrogen, the kerosene vaporizer is provided. But when the raw material for producing hydrogen is originally a gas, the vaporizer for the raw material for producing hydrogen is not necessary. In this case, instead of the vaporizer for the raw material for producing hydrogen, a preheater may be provided.

In the reforming reaction tube, the partial oxidation reforming reaction (the auto-thermal reforming reaction, if the steam reforming reaction is involved) takes place, because oxygen is present. By the heat generated due to this reforming reaction, a high temperature reformed gas is produced and the temperature of the reformer is increased. Especially, the temperature of the partial oxidation reforming catalyst itself is increased by the heat generation, and at the same time, the temperature of the steam reforming catalyst in the rear part thereof is also increased by the reformed gas.

When the heat is generated due to the reforming, combustion by the start-up combustor for may be stopped.

The high temperature reformed gas produced by the reformer 10 is directed to the region 2a (anode gas chamber) in the vessel 2 containing the SOFC to increase the temperature of the SOFC.

On the other hand, almost at the same time as the high temperature reformed gas is fed to the vessel 2, air is fed to the cathode side of the SOFC via the air preheater 4 and the air feed pipe 5. Air discharged from the cathode reacts with the reformed gas which passed through the partition plate 3 to enter the region 2b (combustion chamber) to burn, generating heat also here. With this combustion heat, air is preheated in the air preheater 4 provided in the region 2b.

A combustion gas discharged from the region 2b is directed to the vessel 10b of the reformer to heat the reforming reaction tube 10a from the outside thereof, then, directed to the kerosene vaporizer 21 to vaporize kerosene, and then, directed to the water vaporizer 20 to generate steam. For both of the kerosene vaporizer and the water vaporizer, a known heat exchange structure may be adopted as appropriate.

In such a manner, using the heat generated due to the reforming reaction and the combustion heat generated from combustion of the reformed gas, it is possible to increase each temperature of the reformer and the SOFC.

In a step of combustion in the combustion chamber 2b, when the temperature of the steam reforming catalyst (or the auto-thermal reforming catalyst) is heated to a temperature at which the steam reforming can be performed, supply of air to the reforming reaction tube can be reduced, or stopped.

When the SOFC is heated to a temperature at which it can generate electricity, electric generation can be started, and heat generated due to the electric generation allows heating of the SOFC to be accelerated.

Example 2

Figure 2:
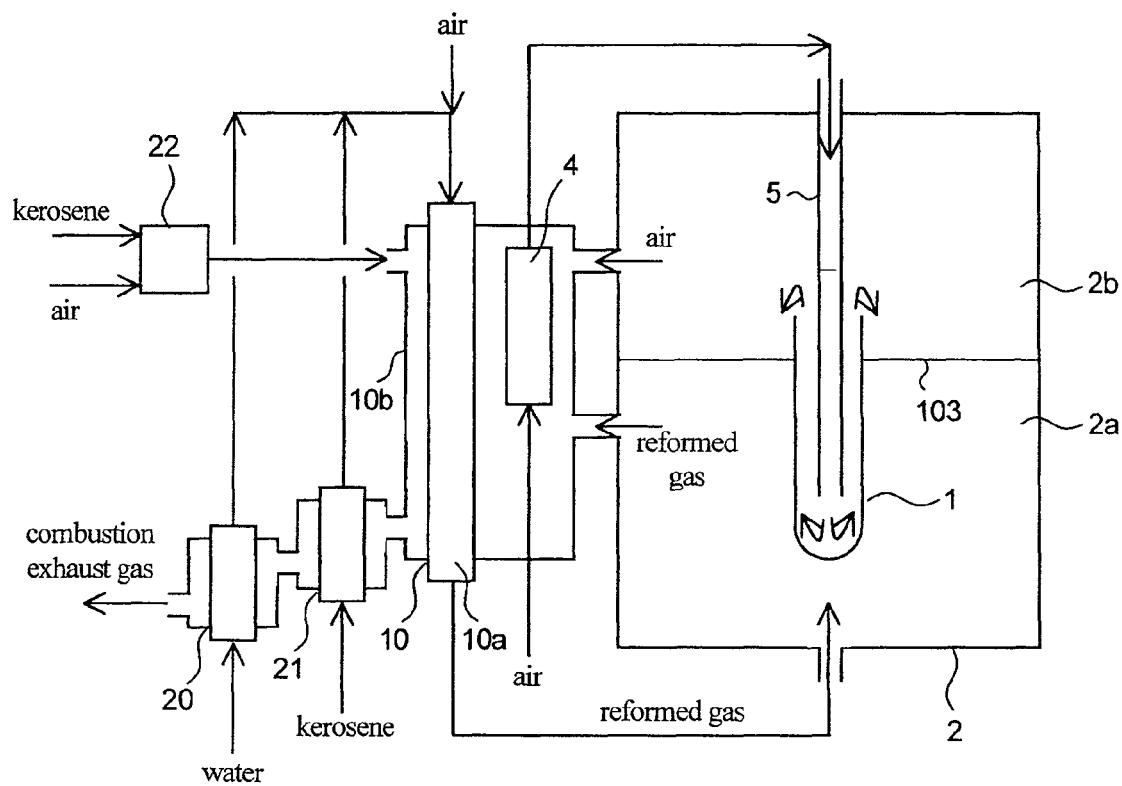
FIG. 2 is a flow diagram illustrating another example of an SOFC system to which a starting-up method of the present invention is applicable.

FIG. 2 illustrates another example of an SOFC system to which the starting-up method of the present invention is applicable. In this SOFC system, a region 2b of an SOFC works only as a header which collects the cathode off gas, and the anode off gas, and the cathode off gas are fed to the inside of a vessel 10b of a reformer (outside of a reforming reaction tube) and burned there, and further, an air preheater 4 is provided there. A region 2a and the region 2b are divided from each other by a partition plate 103 through which a gas can not pass. That is, in this example, the anode off gas is not burned in a vessel containing the SOFC, but it can be burned in the reformer. Except these points, this system is similar to the system shown in the example 1. In relation to the starting-up operation, except that a reformed gas discharged from an anode chamber of the SOFC is burned in the reformer, it can be carried out similarly to the example 1.

For combustion means for burning the cathode off gas and the anode off gas, for example, a burner or a surface burner etc. may be used.

Example 3

Figure 3:
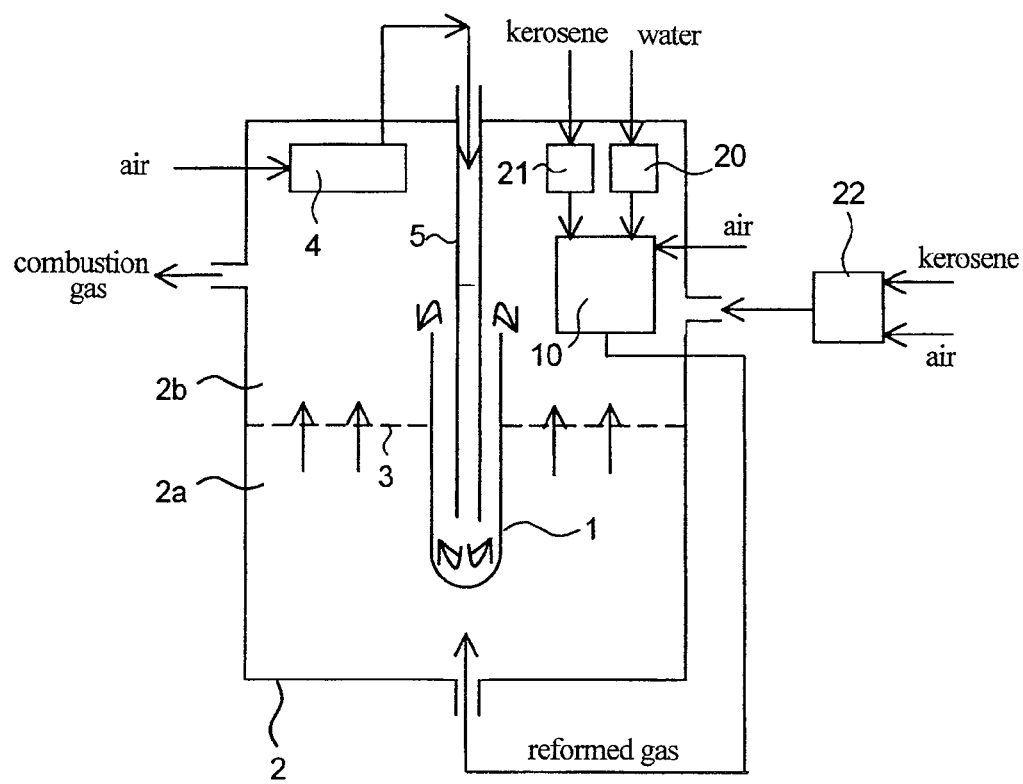
FIG. 3 is a flow diagram illustrating another example of an SOFC system to which a starting-up method of the present invention is applicable.

FIG. 3 illustrates still another example of an SOFC system to which the starting-up method of the present invention is applicable. In this SOFC system, a reformer 10, a kerosene vaporizer 21 and a water vaporizer 20 are provided in a region 2b of a vessel containing an SOFC. In this configuration, because the vessel 2 containing the SOFC is used as a vessel of the reformer, the reformer can be formed of only a reforming reaction part such as a reforming reaction tube. Here, a reformer configured similarly to the reforming reaction tube of the example 1 is used. Further, a combustion gas produced in a start-up combustor 22 is directed to the region 2b, and by this combustion gas, it is possible to increase the temperatures of the reformer, the kerosene vaporizer and the water vaporizer. Except these points, this system is similar to the system shown in the example 1. Also for the starting-up operation, except that the temperatures of the reformer, the kerosene vaporizer and the water vaporizer in the region 2b are increased by the combustion gas of the start-up combustor, it can be carried out similarly to the example 1.

Example 4

Figure 4:
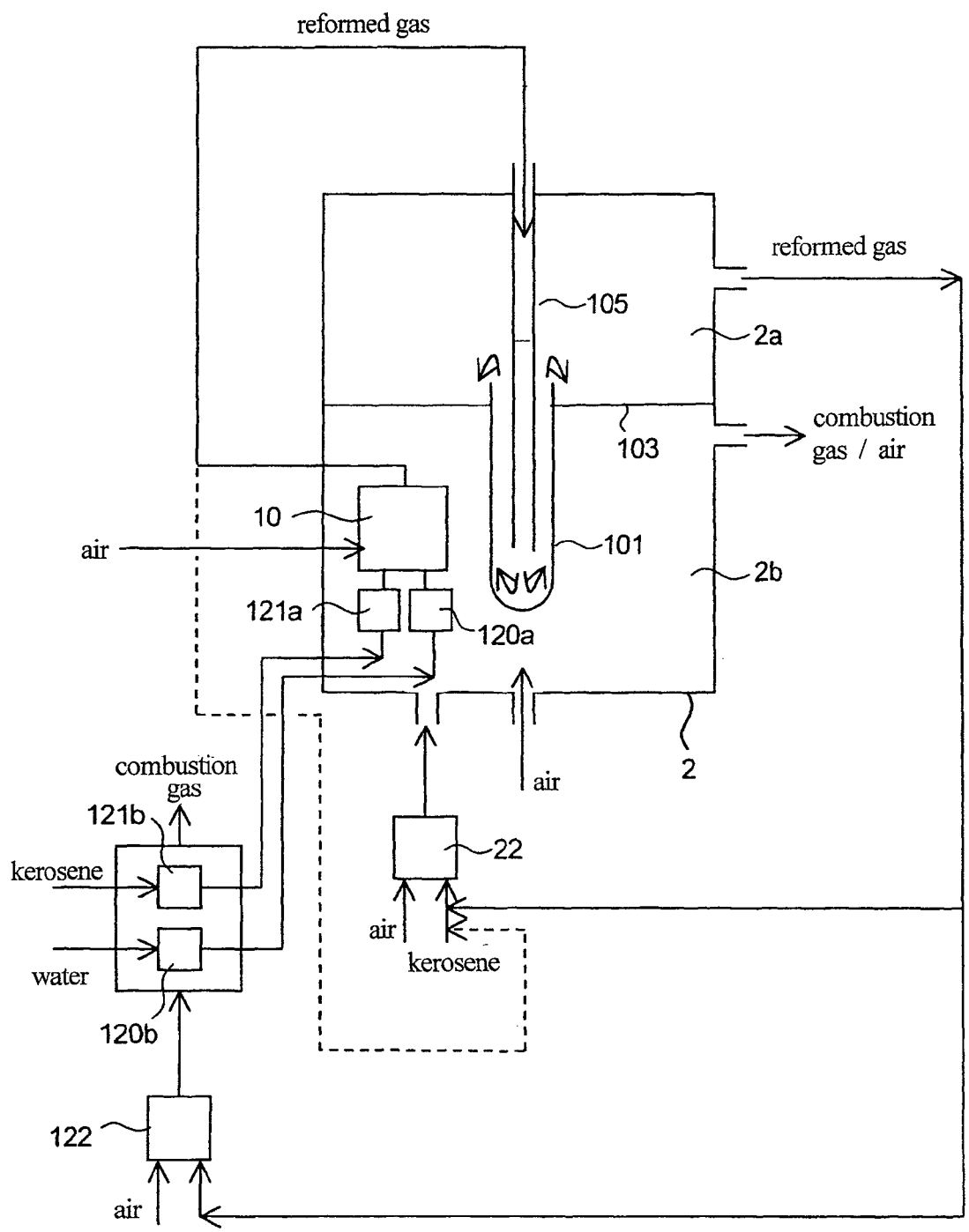
FIG. 4 is a flow diagram illustrating another example of an SOFC system to which a starting-up method of the present invention is applicable.

FIG. 4 illustrates still another example of an SOFC system to which the starting-up method of the present invention is applicable. In this SOFC system, the inside of a tubular SOFC 101 is an anode and the outside is a cathode. The inside of a vessel 2 is divided into a region 2a (works as a header for anode off gas) and a region 2b (cathode gas chamber) by a partition plate 103 through which gas can not pass. In the region 2b (cathode gas chamber), a reformer 10, a start-up water vaporizer 120a and a start-up kerosene vaporizer 121a are provided. Further, outside of the vessel 2 containing an SOFC, a start-up combustor 22 is provided, and the combustion gas produced by the combustor 22 can be directed to the region 2b to heat the reformer, the start-up water vaporizer and the start-up kerosene vaporizer. Further, separately from the start-up combustor 22, a combustor 122 for normal operation is provided, and with the combustion gas produced by this combustor, a water vaporizer 120b for normal operation and a kerosene vaporizer 121b for normal operation can be heated. The reformer 10 is configured similarly to the example 3.

First, kerosene and air are fed to the start-up combustor 22 and burned. The combustion gas produced is fed to the region 2b to increase the temperatures of the start-up water vaporizer 120a, the start-up kerosene vaporizer 121a, the reformer 10 and the SOFC 101.

When each of the reformer, the start-up water vaporizer and the start-up kerosene vaporizer is heated to a predetermined temperature, a partial oxidation reforming catalyst (or an auto-thermal reforming catalyst) is heated to a temperature at which the partial oxidation reforming reaction can proceed, and steam generation and kerosene vaporization become enabled to take place, then, the steam, the vaporized kerosene and oxygen are fed to the reformer, and the partial oxidation reforming reaction (or the auto-thermal reforming reaction, if the steam reforming reaction is involved) is performed. The reformed gas produced by this reformer is fed to the anode of the SOFC 101 through a reformed gas feed pipe 105 to increase the temperature of the SOFC. The reformed gas discharged from the anode to the region 2a is fed to the start-up combustor 22 as a fuel. At this time, supply of kerosene to the start-up combustor 22 may be stopped.

When the SOFC is heated to a temperature at which electric generation can be conducted, the reformed gas discharged from the region 2a is fed to the combustor 122 for normal operation, rather than to the start-up combustor 22. Further, to the region 2b, air is fed. Accordingly, an oxygen concentration in the region 2b (cathode chamber) can be set to be equivalent to that of air. Air can be preheated as appropriate. According to these operations, the reformed gas is burned in the combustor 122 for normal operation, and using heat of its combustion gas, water is vaporized in the water vaporizer 120b for normal operation and kerosene is vaporized in the kerosene vaporizer 121b for normal operation, and then, the steam, the vaporized kerosene and air are fed to the reformer to perform the partial oxidation reforming (or the auto-thermal reforming), and the reformed gas is fed to the anode of the SOFC. To the cathode, air is fed. At this stage, it is possible to start power generation at the SOFC, thereby, to accelerate the temperature increase using together SOFC's own heat which is generated due to electric generation.

After the temperature of the steam reforming catalyst is heated to a temperature at which the steam reforming can be performed, an amount of air supplied to the reformer for the partial oxidation reforming reaction is reduced or this supply of air is stopped, and a heat source required for reforming is shifted from oxidation reaction heat of kerosene to external heating (heating due to heat generated by the combustor 22 or 122), so that the steam reforming reaction is performed. According to this, the hydrogen concentration in the reformed gas can be increased, and as a result, electric generation efficiency of the SOFC can be enhanced. In addition, heat required for the steam reforming reaction can be supplied mainly by the thermal radiation from the SOFC. In this case, the reformer 10 is preferably disposed at a place where the thermal radiation of the SOFC easily reaches.

Example 5

In the example 4, after the partial oxidation reforming catalyst (or the auto-thermal reforming catalyst) is heated to a temperature at which the partial oxidation reforming reaction can proceed, and steam generation and kerosene vaporization become enabled to take place, then, the partial oxidation reforming reaction (the auto-thermal reforming reaction, if the steam reforming reaction is involved) is performed and the reformed gas is fed to the anode of the SOFC 101 through the reformed gas feed pipe 105 to increase the temperature of the SOFC.

In the example 5, instead of feeding the reformed gas to the anode of the SOFC, the reformed gas is fed to the start-up combustor 22 as a fuel, using a line shown by a dotted line in FIG. 4, and then, the reformed gas is burned and the combustion gas produced is fed to the region 2b (cathode gas chamber) to heat the SOFC. Using combustion heat generated from combustion of the reformed gas, the start-up water vaporizer, the start-up kerosene vaporizer and the reformer can be also heated together. At the stage of feeding the reformed gas to the start-up combustor, supply of kerosene to the start-up combustor may be stopped.

In this case, to the anode of the SOFC, the reformed gas is not fed. Therefore, when the SOFC generates electricity, the reformed gas is fed to the anode. For example, when the SOFC is heated to a temperature at which it can generate electricity, the use of the line shown by the dotted line is stopped, and the reformed gas is fed from the reformer 10 to the anode via the reformed gas feed pipe 105. The reformed gas discharged from the anode to the region 2a can be fed to the combustor 122 for normal operation. Further, to the region 2b, preheated air is fed as appropriate. Accordingly, the SOFC is enabled to generate electricity.

Except the described above, the SOFC system can be started similarly to the example 4.

In addition, when the combustion gas is fed to the cathode as in the example 4 and the example 5, from the viewpoint of preventing degradation of the cathode in a reducing atmosphere, it is preferable to manage the combustion gas so that the oxygen concentration in the combustion gas is set to a desired concentration. The oxygen concentration in the combustion gas is governed by the air ratio. As the air ratio is lower (near 1), a higher temperature combustion gas can be produced, and so, the lower air ratio is preferable from the viewpoint of a shorter start-up time. However, as the air ratio is higher, the oxygen concentration is higher, and the higher air ratio is advantageous because of chemical stability of a cathode member. From the viewpoint of this, the oxygen concentration in the combustion gas fed to the cathode is preferably not smaller than 1% (dry mole basis), more preferably not smaller than 3% (dry mole basis), and still more preferably not smaller 5% (dry mole basis).

The invention claimed is:

1. A method for starting-up a solid oxide fuel cell system which comprises a reformer having a reforming catalyst, for reforming raw material for producing hydrogen to produce a reformed gas containing hydrogen, and a solid oxide fuel cell which uses the reformed gas as a fuel, wherein, a catalyst having partial oxidation reforming function and a catalyst having steam reforming function are used as the reforming catalyst, and said method comprises the steps of:
a) combusting a same material as the raw material for producing hydrogen in a start-up combustor to generate heated combustion gas,
b) increasing the temperature of the catalyst having partial oxidation reforming function by the combustion gas to a predetermined temperature at which the partial oxidation reforming reaction can proceed,
c) increasing the temperature of the solid oxide fuel cell by feeding the combustion gas to a cathode of the solid oxide fuel cell,
d) conducting the partial oxidation reforming reaction after reaching the predetermined temperature, increasing the temperature of the catalyst having steam reforming function by the heat generated due to the partial oxidation reforming reaction, and increasing the temperature of the solid oxide fuel cell by feeding the reformed gas to an anode of the solid oxide fuel cell,
e) combusting unused reformed gas discharged from the anode of the solid oxide fuel cell, and heating the catalyst having steam reforming function by heat generated from the combustion, wherein the temperature of the solid oxide fuel cell is increased by feeding the combustion gas produced from combustion of the unused reformed gas discharged from the anode of the solid oxide fuel cell to the cathode of the solid oxide fuel cell, and f) reducing the proportion of the partial oxidation reforming reaction or stopping the partial oxidation reforming reaction, and performing the steam reforming, after the catalyst having steam reforming function is heated to a temperature at which the steam reforming reaction can proceed;

wherein steps a), b), c), d) and e) are performed prior to an initial generation of electricity at the solid oxide fuel cell.

2. The method according to claim 1, further comprising the step of
g) generating electricity at the solid oxide fuel cell, and increasing the temperature of the fuel cell by the cell reaction heat, after the fuel cell is heated to a temperature at which the fuel cell can generate electricity.

3. A method for starting-up a solid oxide fuel cell system which comprises a reformer having a reforming catalyst, for reforming raw material for producing hydrogen to produce a reformed gas containing hydrogen, and a solid oxide fuel cell which uses the reformed gas as a fuel, wherein
a catalyst having partial oxidation reforming function and a catalyst having steam reforming function are used as the reforming catalyst, and
said method comprises the steps of:
i) combusting a same material as the raw material for producing hydrogen in a start-up combustor to generate heated combustion gas,
ii) increasing the temperature of the catalyst having partial oxidation reforming function by the combustion gas to a predetermined temperature at which the partial oxidation reforming reaction can proceed,
iii) increasing the temperature of the solid oxide fuel cell by feeding the combustion gas to a cathode of the solid oxide fuel cell,
iv) conducting the partial oxidation reforming reaction after reaching the predetermined temperature, increasing the temperature of the catalyst having steam reforming function by heat generated from the partial oxidation reforming reaction, increasing the temperature of the solid oxide fuel cell by feeding a combustion gas produced from combustion of unused reformed gas to a cathode of the solid oxide fuel cell, and heating the catalyst having steam reforming function by the combustion gas produced from combustion of the reformed gas, and v) reducing the proportion of the partial oxidation reforming reaction or stopping the partial oxidation reforming reaction and performing the steam reforming, after the catalyst having steam reforming function is heated to a temperature at which the steam reforming reaction can proceed;

wherein steps i), ii), iii) and iv) are performed prior to an initial generation of electricity at the solid oxide fuel cell.

4. The method according to claim 3, further comprising the step of
vi) generating electricity at the solid oxide fuel cell, and increasing the temperature of the fuel cell by the cell reaction heat, after the solid oxide fuel cell is heated to a temperature at which the fuel cell can generate electricity.

5. The method according to claim 1, wherein the catalyst having partial oxidation reforming function is an auto-thermal reforming catalyst.

6. The method according to claim 1, wherein both of the catalyst having partial oxidation reforming function and the catalyst having steam reforming function are auto-thermal reforming catalyst.

7. The method according to claim 1, wherein the step of reducing the proportion of the partial oxidation reforming reaction or stopping the partial oxidation reforming reaction comprises reducing a gas amount containing oxygen or stopping supplying a gas containing oxygen.

8. The method according to claim 1, wherein the method further comprises the step of starting generating electricity when the solid oxide fuel cell is heated to a temperature for generating electricity.

9. The method according to claim 1, wherein the reformed gas is burned in the reformer.

10. The method according to claim 1, further comprising:
stopping combustion of the start-up combustor after the heat is generated due to the reforming.

11. The method according to claim 3, further comprising:
stopping combustion of the start-up combustor after the heat is generated due to the reforming.

12. The method according to claim 1, wherein the predetermined temperature is 200° C.

13. The method according to claim 3, wherein the predetermined temperature is 200° C.

* * * * *

UNITED STATES PATENT AND TRADEMARK OFFICE
CERTIFICATE OF CORRECTION

| | |
|---|---|
| PATENT NO. | : 8,623,563 B2 |
| APPLICATION NO. | : 11/813444 |
| DATED | : January 7, 2014 |
| INVENTOR(S) | : Iwao Anzai |

It is certified that error appears in the above-identified patent and that said Letters Patent is hereby corrected as shown below:

Title page, after Prior Publication Data, add item (30) --Foreign Application Priority Data, Jan. 7, 2005 (JP) 2005-002537--.

Signed and Sealed this
Ninth Day of June, 2015

Michelle K. Lee
*Director of the United States Patent and Trademark Office*

UNITED STATES PATENT AND TRADEMARK OFFICE
CERTIFICATE OF CORRECTION

PATENT NO. : 8,623,563 B2  
APPLICATION NO. : 11/813444  
DATED : January 7, 2014  
INVENTOR(S) : Iwao Anzai Page 1 of 1

It is certified that error appears in the above-identified patent and that said Letters Patent is hereby corrected as shown below:

Title page, item 86, replace "PCT/JP2006/000017" with --PCT/JP2006/300017--.

Signed and Sealed this  
Fifteenth Day of September, 2015

Michelle K. Lee  
*Director of the United States Patent and Trademark Office*